Dec. 7, 1954  E. E. WETTLEY  2,696,215
SELF-OPENING BOBBY PIN
Filed Aug. 3, 1951
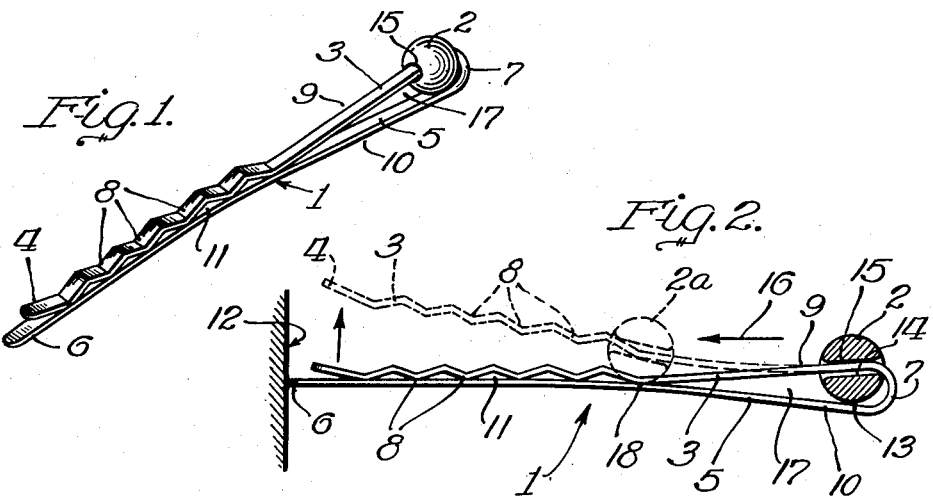
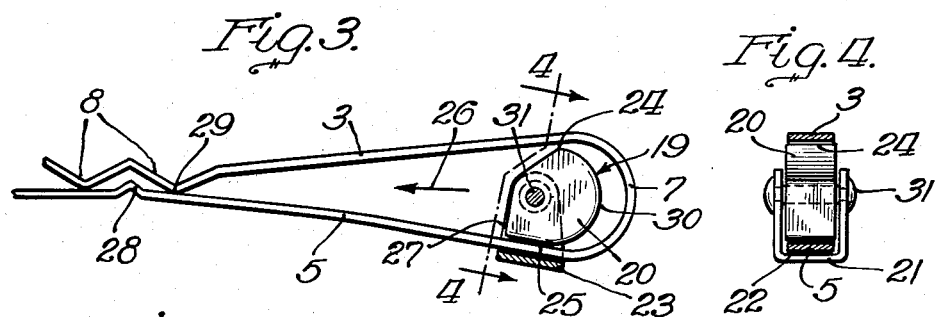
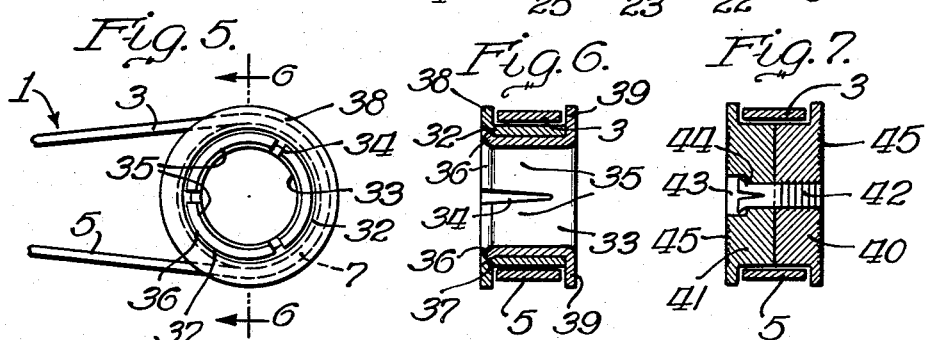
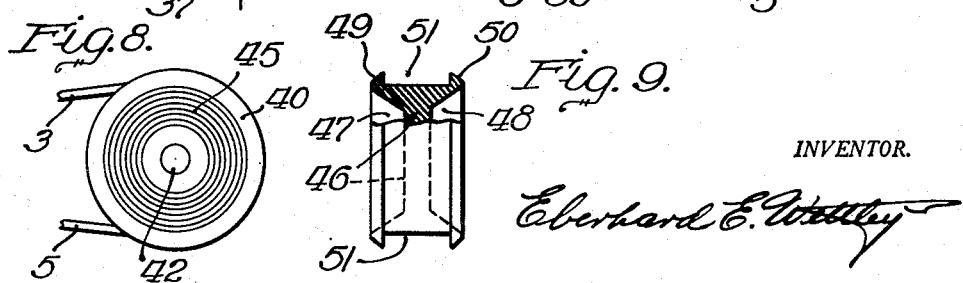
INVENTOR.
Eberhard E. Wettley

United States Patent Office 2,696,215
Patented Dec. 7, 1954

2,696,215

SELF-OPENING BOBBY PIN

Eberhard E. Wettley, Chicago, Ill.

Application August 3, 1951, Serial No. 240,077

2 Claims. (Cl. 132—50)

This invention relates to an improvement in hairpins.

More specifically, the improvement relates to the provision of means connected with a bobby pin for spreading the tines thereof whereby the hairpin may be easily applied by the user.

Numerous devices have been designed for the purpose of spreading the tines of a hairpin to open the legs or tines thereof so that the user may spread the tines apart for insertion into the hair. However, most of these devices have proven unsatisfactory and women still resort to the age old habit of using their teeth or fingernails for opening hairpins such as the bobby pin for insertion into the hair. Obviously, the latter methods are bad for the teeth and for the nails.

It is one of the main objects of the present invention to provide a spreading member which is assembled with the hairpin of the bobby pin type and which may be moved along the length of the pin to spread the tines apart sufficiently for use or sufficiently for further spreading by the fingers and subsequently for insertion into the hair.

Other objects and advantages shall be hereinafter set forth in the various modified arrangements of the present device for spreading the legs or tines of a hairpin as will subsequently appear in the following detailed description having reference to the drawings forming a part of the specification.

In the drawings:

Fig. 1 is a perspective view of a conventional bobby pin type of hairpin incorporating in combination with the pin the tine spreading device of the present invention;

Fig. 2 is a side elevational view of the hairpin construction illustrated in Fig. 1 with the tine spreading member in cross section, this view diagrammatically illustrating the manner in which the tines are opened by a user;

Fig. 3 illustrates a fragmentary side elevational view of the loop end of a hairpin and illustrating a modified construction of tine spreading device as associated with this pin;

Fig. 4 is a detail cross sectional view taken substantially along the line 4—4 in Fig. 3;

Fig. 5 is a side elevational view of a fragmentary portion of a hairpin loop embodying a further modified arrangement of the hairpin spreading device;

Fig. 6 is a vertical cross sectional view taken substantially along the line 6—6 in Fig. 5;

Fig. 7 is another cross sectional view of a modified arrangement of spreading member deviating somewhat from the form shown in Fig. 6;

Fig. 8 is a side elevational view of the construction shown in Fig. 7 as the same appears when looking from the right hand side thereof; and Fig. 9 is an edge elevational view of another modified construction of spreading member with a part thereof broken away to illustrate a portion thereof in section.

As best shown in Fig. 1, the combination of improved hairpin includes a bobby pin 1 and a movable bead 2 which is slidably mounted upon the upper tine 3 of the pin. The bead 2 may be assembled with the pin by endwise movement from the free end 4 of the tine 3, or the bead 2 may be used upon the lower tine 5 by insertion over the free end 6 of the latter and moving the bead toward the loop end 7 of the bobby pin 1. It is preferable to dispose the bead 2 upon the upper tine 3 inasmuch as the hair holding deformations 8 will restrict the free motion of the bead 2 toward the end 4 of the tine 3, and furthermore, the bead 2 will then be disposed on the side of the pin which is normally away from the user's head.

As also best seen in Figs. 1 and 2, the tines 3 and 5 are arranged divergently outwardly at 9 and 10 respectively from the hair clamping portion 11 of the pin 1 and terminate in the loop 7 which joins the two legs or tines of the pin 1. This provides a recess for the bead 2 when the pin is not in use or when the pin is used in the wearer's hair so that the bead 2 will not interfere with the clamping action of the tines 3 and 5.

As shown in Fig. 2, the bead 2 may be moved to the broken line position 2a by grasping the hairpin with the bead between the fingers and by engaging the free end 6 of the tine 5 against any solid surface such as 12 and by pushing the bead 2 forward into the dotted line position illustrated in Fig. 2. This action causes a portion of the outer surface 13 of the bead to provide one cam surface for engaging the inside surface of the lower tine 5 and simultaneously causing a surface portion 14 of the circular bore aperture 15 in the bead 2 to engage the surface of the upper tine 3, whereby cooperative camming action is brought about which will cause the tines to spread as the bead 2 moves forwardly in the direction of the arrow 16. The spreading action begins intermediate the length of the pin opening 17 and will reach its greatest extend when the bead is disposed between the tines at the point 18 in which position the upper tine 3, as shown in broken lines in Fig. 2, is swung upwardly as there illustrated.

When the bead 2 is carried upon the hairpin 1 as shown, it cannot turn about the end of the loop 7 and the actual proportions, referring to the diameter of the round hole 15 in the head 2, may be such as to provide a certain binding action or cocking of the bead over the deformations 8 when such bead is assembled with the pin. In other words, the deformations present a certain amount of springing leeway so that the hole 15 may be made of such a diameter as will fit over the tine so as to bypass the deformations 8 with a certain amount of force. Thus the bead 2, which is freely and rotatably carried upon the tine 3, obviously cannot move to the right as shown in Fig. 2 beyond the loop 7 and would, under normal operative conditions, be held substantially in the position shown at 2a without the use of additional force to remove the bead from the tine.

In the use of the pin, the operator can easily pick up the pin by the spread tines and in opening the same slightly further for insertion into the hair, the tines are normally held upwardly whereupon the bead will drop from the position 2a back to the loop 7. Furthermore, it would be an easy matter for the operator merely to push the bead backward to the loop 7 with her finger during insertion of the pin into the hair. The bead also serves as a finger rest at the closed pin end.

The bead 2 may be made from any selected material, and whether of glass, plastic or wood, the surface of the bead or the entire material used may be brightly colored to provide a decorative effect to enhance the appearance of the pin when disposed in the wearer's hair. By the same token, the bead 2 may be colored as the bobby pin 1 to present a more blending color with the hair, in which case the pin and bead would be less conspicuous and not very well discernable while in use. Since the head is rotatably and freely mounted upon a leg of the bobby pin and also provides a cam unit of minimum surface contact area with the other of the legs of the pin, this arrangement definitely counteracts hair entrapment between the cam member and the pin parts and also permits the free release of hair from the bobby pin during the withdrawal of the pin from active use in the hair.

Figs. 1 and 2 illustrate the simplest form of the invention and show one form wherein a bead or cam member such as 2 can be used in connection with the upper tine 3 having the deformations 8 and wherein the bead structure is normally disposed away from the smooth tine 5 which generally abuts the head of the wearer. If it is desirable to assemble the bead directly with the wire material of the pin before the structure is bent into the form shown in Figs. 1 and 2, it is possible to use a flat opening to snugly surround one of the tines through which means the bead will not be rotatable upon the axis of the tine. In this case, the top of the bead can be flattened since the camming surface portion 13 will then always be disposed in contact with the tine 5. An arrangement simulating the foregoing modification is illustrated in Fig. 3 wherein a cam assembly 19 is mounted upon the lower tine 5 and comprises a two piece member having a camming member 20 and a securing strap 21 which together provide a rectangular restricted opening 22 that surrounds the tine 5 to prevent rotation of the camming structure about the axis of the tine 5. This particular camming arrangement could be easily assembled with either the upper tine 3 or the lower tine 5. By reason of the flatness of the projecting portion 23 of the securing strap 21 the location shown will not be objectionable since the wearer will not be aware of the slight protrusion used in this form of construction.

In the arrangement shown in Figs. 3 and 4, the camming member 20 has a high cam point 24 and a lower cam surface 25. Movement of the cam structure 19 in the direction of the arrow 26 will cause the forwardly positioned and upwardly arranged beveled surface of the member 20 to engage the first deformation 8 of the tine 3 until the high point 24 acts to cam the tine 3 upwardly, while the lower cam surface 25 will cam the tine 5 downwardly. When the forward end 27 of the camming member 19 strikes the stop 28 provided in the lower tine 5, the high cam point 24 will be in operative engagement with the cam point 29 of the deformations 8 of the tine 3. Therefore, in this arrangement we have a forward stop which limits the forward motion of the camming structure 19 in the direction of the arrow 26, while the rounded surface 30 of the cam 20 will engage the inside of the loop 7 to discontinue the motion of the cam structure toward the looped end of the pin.

Any central fastening such as the rivet 31 may be used to join the cam 20 and securing strap 21 together, and as shown in Fig. 3, no rotation of the cam 20 is possible by reason of the extent of the flat surface 25 adjacent the inner side of the lower tine 5.

A further modification of a tine spreading member in combination with a hairpin is illustrated in Figs. 5 and 6 wherein oppositely related thimbles 32 and 33 are joined together in spring clip fashion by assembling these parts from the laterally outward sides of the loop 7 of the hairpin 1. The inner portion has a plurality of slots 34 to provide annular spring sections 35 which terminate in angled peripheral ends 36 that snap into the bevelled recess 37 of the outer thimble 32 when the two parts are brought together as shown in Fig. 6.

In this construction, both thimbles 32 and 33 are formed with annular flanges 38 and 39 respectively which flank the lateral edge portions of the tines 3 and 5 at the loop 7, thus holding the entire assembly in the proper position for movement along the length of the pin through which action the legs or tines 3 and 5 of the hairpin are spread apart similarly as in the other forms previously described.

The modified arrangement in Figs. 7 and 8 presents two assembled members 40 and 41 held together by a snap pin 42 that enlarges within a recess 43 through the spreading of the split ends 44 thereof. This arrangement of the cam member presents solid sides having portions thereof serrated or deformed as shown at 45 in Figs. 7 and 8 to provide finger gripping means to aid in moving this cam structure along the length of the pin. This differs somewhat from the construction shown in Figs. 5 and 6 wherein a central opening is provided to receive the fingertips for the same purpose.

Fig. 9 illustrates a solid form of cam structure which may be assembled from the front end of the pin between the tines 3 and 5 or which might preferably be snapped laterally into the pin loop formed by the diverging portions of the tines 9 and 10 and the loop 7. This form provides a relatively thin central section 46 having lateral cup portions 47 and 48 for the reception of the fingertips for moving the unit, and this structure is preferably semi-resilient with bevelled edges 49 and 50 that will augment lateral assembly of this unit with the pin loop. This cam structure also has the annular recess 51 within which the time portions are disposed upon assembly of this cam structure with the pin.

Further deviations and modifications of the exact structure of the invention herein described are also contemplated, but any such further modifications and deviations shall be governed by the breadth and scope of the language of the appended claims.

What I claim is:

1. In a bobby pin having at least two hair gripping tines with at least one tine thereof provided with deformations thereon, said tines being joined by a loop having legs converging therefrom to connect with said hair gripping tines respectively, said loop and legs together defining an open eye at the closed end of said pin, the improvement which comprises a bead having a circular tine receiving aperture therethrough and said bead being solely carried upon said deformed hair gripping tine and at the open eye portion of the pin, said bead when in the aforesaid location being disposed out of operative relation with respect to the other leg of said loop, said bead comprising movable means to engage the other leg of said pin and to spread said tines apart when the bead is actuated along its supporting tine between said legs and away from said pin loop, the maximum spread of said tines being attained when said bead is moved into a location generally coincident with the first deformation of the tine carrying the bead with said deformation disposed in cocked relation within said bead aperture, and said bead aperture being constructed and proportioned to cause such binding of said bead at the first tine deformation as the latter enters said bead aperture to a predetermined amount whereby said bead is held against further motion away from said pin loop at the maximum tine separation position and under normal bead actuation during the use of the bobby pin.

2. In a bobby pin having at least two hair gripping tines with at least one tine thereof provided with deformations thereon, said tines being joined by a loop having legs converging therefrom to connect with said hair gripping tines respectively, said loop and legs together defining an open eye at the closed end of said pin, the improvement which comprises a circular cam member having a circular bore formed therethrough, said cam member being carried by means of said bore upon the loop leg connected with the deformed tine, said latter leg being disposed through said cam member bore with the circular portion of the cam member arranged about the longitudinal axis of said loop leg to dispose any given surface portion of the circular cam member in close proximity to the other of said loop legs when said cam member is positioned at the open eye end of the bobby pin adjacent the loop, said cam member comprising means to cause separation of said hair gripping tines as the cam member is actuated away from said loop toward said hair gripping tines, and said circular cam member bore being constructed and proportioned to cause frictional binding of said member over the first deformation of the tine associated with said member carrying leg to interrupt movement of said member substantially coincident with the location of said first tine deformation under normal conditions of use in spreading the tines of the bobby pin.

References Cited in the file of this patent

UNITED STATES PATENTS

| Number | Name | Date |
| --- | --- | --- |
| 1,082,333 | Hughes | Dec. 23, 1913 |
| 2,262,223 | Chessin | Nov. 11, 1941 |
| 2,510,821 | Hodson et al. | June 6, 1950 |
| 2,531,024 | Bolinger | Nov. 21, 1950 |